United States Patent
Sanjeev

(10) Patent No.: US 9,009,251 B1
(45) Date of Patent: Apr. 14, 2015

(54) SERVER CONTENT ADJUSTED BASED ON AUTOMATED REPORT OF AVAILABLE CLIENT BANDWIDTH

(75) Inventor: Kumar Sanjeev, San Ramon, CA (US)

(73) Assignee: Cellco Partnership, Basking Ridge, NJ (US)

( * ) Notice: Subject to any disclaimer, the term of this patent is extended or adjusted under 35 U.S.C. 154(b) by 752 days.

(21) Appl. No.: 12/845,456

(22) Filed: Jul. 28, 2010

(51) Int. Cl.
*G06F 15/16* (2006.01)
*H04L 29/08* (2006.01)
*H04L 12/58* (2006.01)
*G06F 17/30* (2006.01)

(52) U.S. Cl.
CPC ............ *H04L 67/2823* (2013.01); *H04L 51/06* (2013.01); *G06F 17/30905* (2013.01)

(58) Field of Classification Search
CPC ..................... G06F 17/30905; H04L 67/2823; H04L 51/06
USPC .......................................................... 709/217
See application file for complete search history.

(56) References Cited

U.S. PATENT DOCUMENTS

| | | | |
|---|---|---|---|
| 6,662,233 B1* | 12/2003 | Skarpness et al. ............ | 709/246 |
| 8,200,837 B1* | 6/2012 | Bhatti et al. .................. | 709/232 |
| 2002/0073197 A1* | 6/2002 | Bhogal et al. ................. | 709/224 |
| 2002/0116518 A1* | 8/2002 | Silen et al. .................... | 709/231 |
| 2008/0263010 A1* | 10/2008 | Roychoudhuri et al. ......... | 707/3 |
| 2010/0333028 A1* | 12/2010 | Welsh et al. .................. | 715/833 |
| 2011/0153863 A1* | 6/2011 | Khan et al. .................... | 709/235 |

OTHER PUBLICATIONS

Seshan et al. Benefits of Transparent Content Negotiation in HTTP. IEEE. Nov. 1998.*
Zhang. Web Content Adaptation for Mobile Handheld Devices. Feb. 2007.*

* cited by examiner

*Primary Examiner* — Bryan Lee

(57) ABSTRACT

An information server computer system may be configured to receive a request for electronic information from a client computer system. In response, a request to the client computer system may be delivered for an automated report of the bandwidth that is available for delivery of the electronic information. The client computer system may provide the automated report in response. In response, the information server computer may select a form of the electronic information which is substantially compatible with the bandwidth specified in the automated report from among multiple forms that are each compatible with a different available bandwidth.

16 Claims, 2 Drawing Sheets

SERVER CONTENT ADJUSTED BASED ON AUTOMATED REPORT OF AVAILABLE CLIENT BANDWIDTH

CROSS-REFERENCE TO RELATED APPLICATIONS

This application is related to U.S. patent application Ser. No. 12/829,869, entitled "Data Communication Device With Individual Application Bandwidth Reporting And Control," filed Jul. 2, 2010. The entire content of this application is incorporated herein by reference.

BACKGROUND

1. Technical Field

This disclosure relates to the delivery of electronic information over network communication systems, including real time information that may require a bandwidth greater than what is available.

2. Description of Related Art

Client computer systems often seek electronic information from information server computer systems over network communication systems, such as the internet.

The bandwidth which is available for the delivery of this electronic information to each client computer system may be limited. Further, the available bandwidth for each client computer system may be different. This can cause problems in connection with the delivery of certain kinds of electronic information, such as information which must be viewed in real time, such as streaming multimedia. Dropouts and other types of problems can arise.

Some websites attempt to deal with this problem by maintaining different versions of multimedia content, each configured for a particular bandwidth. Users are then be asked to select which version may be appropriate for their particular bandwidth.

This approach can be problematic. For example, requiring the user to provide bandwidth information each time the user visits a website can increase the complexity of the user's experience, slow down the process, and require space on a web page to be dedicated to the various bandwidth choices. Users may also consider it a nuisance to have to constantly be providing this information. Users may not even know what bandwidth their computer can handle, particularly when an application which seeks data is only of several which are communicating data simultaneously over the same network connection.

SUMMARY

An information server computer system may include a network interface and an electronic data processing system.

The network interface may be configured to communicate with a client computer system over a network communication system.

The electronic data processing system may be configured to receive a request for electronic information which the network interface has received from the client computer system. In response to the request, the electronic data processing system may be configured to cause the network interface to deliver a request to the client computer system for an automated report of the bandwidth that is available for delivery of the electronic information. The electronic data processing system may be configured to receive an automated report of the bandwidth that is available for delivery of the electronic information which the network interface has received from the client computer system. In response to the automated report, the electronic data processing system may be configured to select a form of the electronic information which is substantially compatible with the bandwidth specified in the automated report from among multiple forms that are each compatible with a different available bandwidth. The electronic data processing system may be configured to cause the network interface to deliver the electronic information in the selected form to the client computer system.

The requested electronic information may includes image information. The selection of a form of the electronic information may include selecting a version of the image information that has a resolution that is substantially compatible with the bandwidth specified in the automated report from among multiple versions that are each compatible with a different available bandwidth.

The requested electronic information may include a mixture of text and image information. The selection of a form of the electronic information may include selecting a mixture of text and image information that has a ratio of text-to-image information that is substantially compatible with the bandwidth specified in the automated report from among multiple mixtures that are each compatible with a different available bandwidth.

When the bandwidth specified in the automated report is reasonably likely to result in dropouts or other adverse effects during the delivery of the electronic information to the client computer system, the selection of a form of the electronic information may include selecting a form of the electronic information that includes a notice that delivery of the electronic information may suffer from dropouts or other adverse effects.

The electronic data processing system may be configured to repeatedly cause the network interface to request and receive automated reports of the bandwidth that is available for delivery of the electronic information. In response to each automated report, the electronic data processing system may be configured to select a form of the electronic information which is substantially compatible with the bandwidth specified in the latest automated report from among multiple forms that are each compatible with a different available bandwidth, and cause the network interface to deliver the remaining portion of the electronic information in the last-selected form to the client computer system.

The request for an automated report may be delivered by the network interface to the client computer system in a form which causes the request not to be communicated to a user of the client communication system though a user interface.

Non-transitory, tangible, computer readable media containing computer programming instructions which, when executed by an information server computer system having a network interface configured to communicate with a client computer system over a network communication system and an electronic data processing system, may cause the electronic data processing system to implement the functions described herein.

A client computer system may include a network interface and an electronic data processing system.

The network interface may be configured to communicate with an information server computer system over a network communication system.

The electronic data processing system may be configured to cause the network interface to deliver a request to the information server computer system for electronic information. The electronic data processing system may be configured to receive a request which the network interface has received from the information server computer system for an automated report of the bandwidth that is available for delivery of the electronic information. The electronic data processing system may be configured to automatically cause the network interface to deliver an automated report of the bandwidth that is available for delivery of the electronic information without receiving user input relating to the content of the automated report following receipt of the request for the automated report. The electronic data processing system may be configured to receive the requested electronic information which the network interface has received from the information server computer system in a form that is substantially compatible with the bandwidth specified in the automated report.

The client computer system may include an information storage system configured to store information indicative of the bandwidth that is available for electronic information requested by the client computer system to be delivered to the client computer system for each of a plurality of different user applications. The electronic data processing system may be is configured to cause the network interface to deliver the request to the information server computer system for the electronic information when requested by one of the applications, and base the bandwidth specified in the automated report on the information in the information storage system that is indicative of the available bandwidth for this one application.

The bandwidth specified in the automated report may be substantially less than the bandwidth which the client computer system can handle.

The bandwidth specified in the automated report may be based on a bandwidth test of the client computer system which is performed by the client computer system.

Non-transitory, tangible, computer readable media containing computer programming instructions which, when executed by an information server computer system having a network interface configured to communicate with a client computer system over a network communication system and an electronic data processing system, may cause the electronic data processing system to perform the functions recited herein.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details which may be apparent or unnecessary may be omitted to save space or for more effective illustration. Conversely, some embodiments may be practiced without all of the details which are disclosed. When the same numeral appears in different drawings, it refers to the same or like components or steps.

DETAILED DESCRIPTION OF ILLUSTRATIVE EMBODIMENTS

Illustrative embodiments are now discussed. Other embodiments may be used in addition or instead. Details which may be apparent or unnecessary may be omitted to save space or for a more effective presentation. Conversely, some embodiments may be practiced without all of the details which are disclosed.

Figure 1:
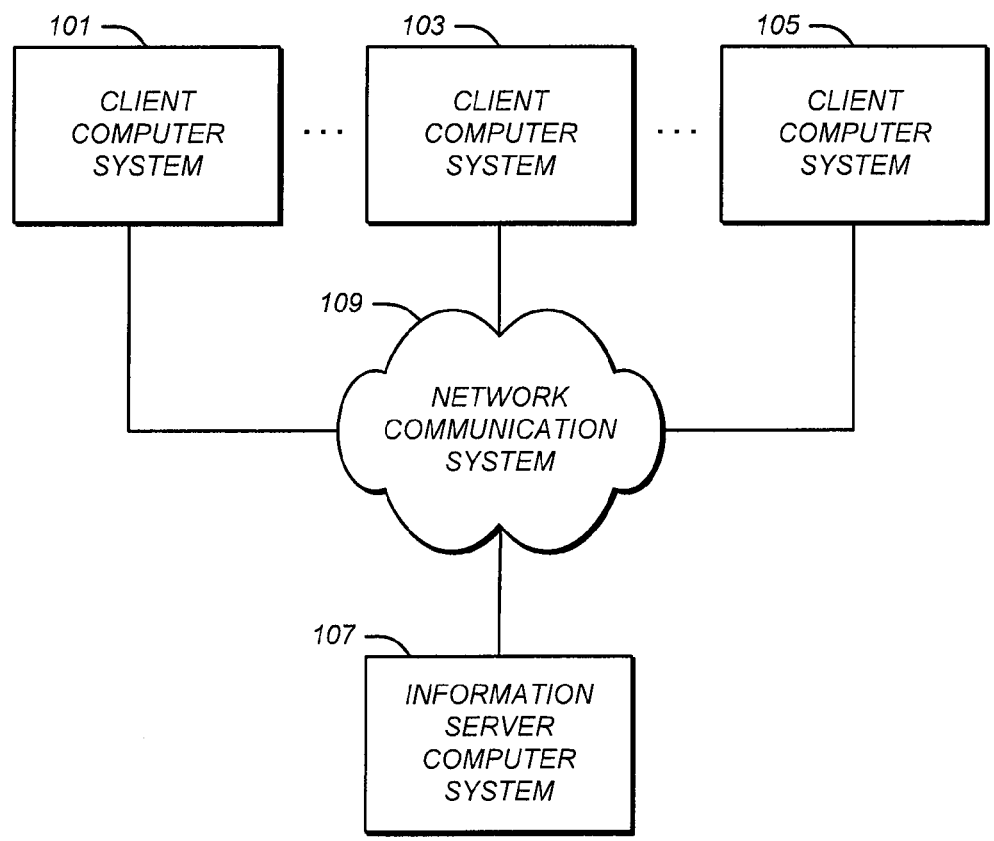
FIG. 1 illustrates client communication systems that may seek electronic information from an information server computer system over a network communication system.

FIG. 1 illustrates client communication systems that may seek electronic information from an information server computer system over a network communication system. As illustrated in FIG. 1, one or more client computer systems, such as client computer systems 101, 103, and 105, may seek electronic information from an information server computer system 107 over a network communication system 109.

Each client computer system may be of any type. For example, a client computer system may be a desktop computer, a laptop computer, a PDA, and/or part of a cell phone. Each client computer system may include appropriate computer hardware and software configured to request electronic information and to receive and process the electronic information in response.

The requested electronic information may be of any type. For example, the requested electronic information may consist of or include one or more electronic files, such as image and/or text files. The requested electronic information may in addition or instead include streaming information, such as streaming audio, streaming video, and/or streaming audio and video. When requesting streaming information, the client computer system may be configured to immediately communicate the received streaming information to a user, such as through a display and/or a sound system.

The electronic information may consist of or include mixtures of image and text information. For example, the electronic information may be a web page which contains text and images.

Each client computer system may be able to receive electronic information at only a limited rate, i.e., may have only a limited bandwidth. This bandwidth limitation may be attributable to the slowest portion of the network communication system over which the electronic information is delivered. The bandwidth available to a particular application may be limited by other applications which are simultaneously communicating information over the network communication system and thus utilizing a portion of the total available bandwidth.

The network communication system 109 may be of any type. For example, the network communication system may consist of or include the internet, a local area network, and/or a wide area network. It may include wired and/or wireless segments.

The information server computing system 107 may be of any type. For example, it may be one or more computers that are connected to the internet and configured to function as a server. The server may be configured to deliver any type of electronic information, such as text files, image files, sound files, video files, and/or sound and video files. The system may be configured to download the information and/or to stream the information.

Figure 2:
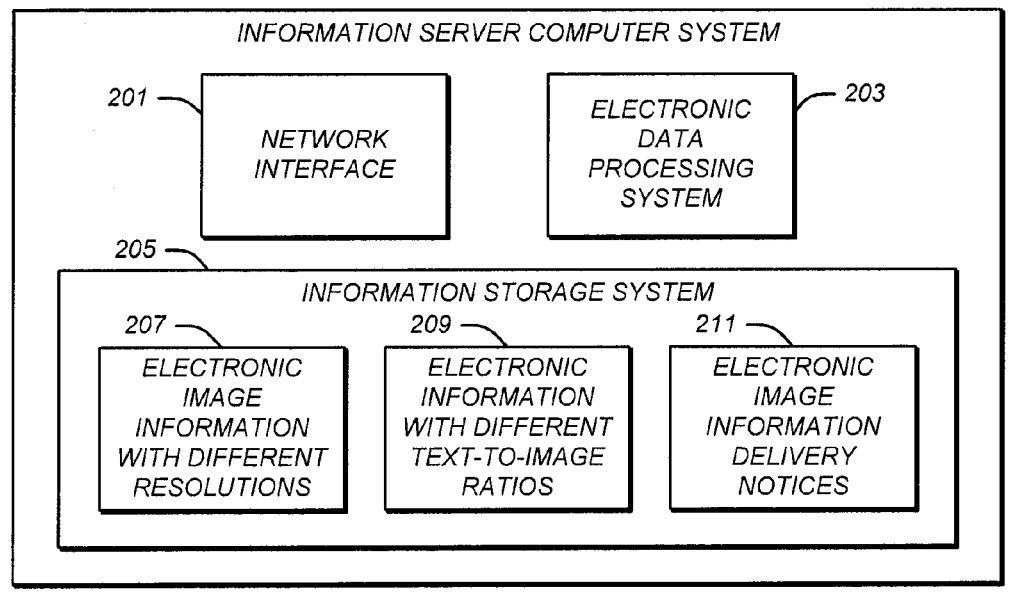
FIG. 2 illustrates an information server computer system.

FIG. 2 illustrates an information server computer system. The information server computer system illustrated in FIG. 2 may be used as the information computer server system 107 illustrated in FIG. 1 or in connection with a different system. Similarly, the information server computer system 107 may be different than the information server computer system illustrated in FIG. 2.

As illustrated in FIG. 2, an information server computer system may include a network interface 201, an electronic data processing system 203, and an information storage system 205 which may contain electronic image information with different resolutions 207, electronic information with different text-to-image ratios 209, and/or electronic information delivery notices 211. The components of the information server computer system may be at a single location or distributed across multiple locations.

The network interface 201 may be configured to communicate with a client computer system over a network communication system, such as the client computer system 101, 103, and/or 105 and the network communication system 109.

The network interface 201 may be of any type. It may include appropriate electronic hardware and software configured to provide the necessary network communications. The network interface 201 may include devices such as network interface cards ("NICs").

The electronic data processing system may include computer hardware and software configured to perform the functions recited herein. The electronic data processing system 203 may include one or more processors and associated support chips, interface devices, including user interface devices, application programs, and operating systems.

The network interface 201 may receive a request for electronic information from a client computer system. The request may arrive in any form.

This request may, in turn, be passed on to the electronic data processing system 203. In response, the electronic data processing system 203 may generate a request for an automated report of the bandwidth that is available for delivery of the electronic information. The electronic data processing system 203 may deliver this request to the network interface 201 for delivery to the client computer system. This request may be in any form.

The network interface 201 may then receive an automated report of the bandwidth that is available for delivery of the electronic information. The word "automated" is intended to refer to a process in which the content of the automated report is supplied automatically by the client computer system, without user input following receipt of the request for the report.

This automated report may be in any form. For example, it may include information specifying the bandwidth in bits per second, bytes per second, by specifying the type of internet connection to the client computer system (e.g., DSL or cable), by general language (e.g., high, medium, or low), and/or in any other form. This automated report may be delivered by the network interface 201 to the electronic data processing system 203.

In response to the automated report, the electronic data processing system may select a form of the electronic information which is substantially compatible with the bandwidth specified in the automated report from among multiple forms that are each compatible with a different available bandwidth. These multiple forms may be stored in the information storage system 205.

The information storage system 205 may be configured to store any type of electronic information. It may include one or more non-transitory, tangible, electronic storage devices, such as one or more hard disk drives, RAMS, ROMS, E-PROMS, and/or flash memories.

The electronic information may include image information. The image information may be in the form of individual images and/or a sequence of images, such as frames of a motion picture. The information storage system 205 may store multiple versions of the same image information in different resolutions. For video streams, these different resolutions may be in the form of different bit rates. For still images, the different resolutions may be in the form of a different number of pixels for each the image. The information may or may not be in a compressed format.

The electronic data processing system 203 may select a version of the image information that has a resolution that is substantially compatible with the bandwidth specified in the automated report from among those that are stored in the information storage system. If a small bandwidth is specified in the report, for example, the electronic data processing system 203 may select image information with a low resolution. Conversely, if a high bandwidth is specified in the report, image information having a high resolution may instead be selected. The electronic data processing system 203 may then cause the network interface 201 to deliver the electronic information in the selected form to the client computer system.

The requested electronic information may in addition or instead include a mixture of text and image information, such as a web page containing both text and images. The information storage system 205 may store multiple forms of the requested information, each with a different ratio of text-to-image, such as the electronic information with different text-to-image ratios 209. The electronic data processing system 203 may then select the version of the electronic information which has a text-to-image ration that is substantially compatible with the bandwidth specified in the automated report. For example, if a low bandwidth is specified in the report and the electronic information is a web page with both text and images, a version of the web page may be selected that has mostly text and few images. Conversely, if a high bandwidth is specified in the report for the same electronic information, a version of the web page may be selected which has numerous images and little text.

In a still further example, a notice may be considered part of the electronic information which is requested. Different versions of these notices may be compatible with different available bandwidths. All versions of these notices may be stored in the information storage system 205 as the electronic image information delivery notices 211.

For example, if a low bandwidth is specified in the automated report, this may mean that it is reasonably likely that dropouts or other adverse effects may be experienced during the delivery of the electronic information to the client computer system. In this event, the electronic data processing system 203 may select a notice from the electronic image information delivery notices 211 which informs the user of the client computer system that delivery of the electronic information may suffer from dropouts or other adverse effects. Any type of words, images, or other information may be contained within the notice to communicate this information.

On the other hand, if the bandwidth specified in the automated report is high, there may be no reasonable likelihood of dropouts or other adverse effects during the delivery of the electronic information to the client computer system. In this situation, the electronic data processing system 203 may deliver the electronic information without any notice or with a notice advising that uninterrupted and error free delivery is anticipated. If a favorable notice is provided, it may again be selected from the electronic image information delivery notices 211.

The electronic data processing system 203 may be configured to repeatedly cause the network interface 201 to request automated reports of the bandwidth that is available for delivery of the electronic information and to receive from the network interface 201 each automated report which is provided by the client computer system in response. This may be done in recognition of the fact that the available bandwidth for a particular client computer system may change, possibly due to changes in the load on the network communication system and/or changes in the number and/or way in which other applications in the client computer system are using the available bandwidth. In this situation, the electronic data processing system 203 may, in response to each sequential automated report which is received, select a form of the electronic information which is substantially compatible with the bandwidth specified in the latest automated report. The electronic data processing system 203 may then cause the network interface 201 to deliver the remaining portion of the electronic information in the last-selected form to the client computer system.

For example, the electronic data processing system 203 may be causing the network interface 201 to be delivering a streaming video to the client computer system. The electronic data processing system 203 may have initially selected a version of this video with a resolution (e.g., bit rate) which is compatible with the first-reported available bandwidth. During delivery of this stream, however, a new bandwidth report may indicate that the available bandwidth has changed significantly. In this situation, the electronic data processing system 203 may select a different version of the same image information that better matches the available bandwidth and to cause the network interface 201 to deliver this different version instead, beginning at the point in time where the previous version was just cut off.

Any criteria may be used to control the timing of these repeated requests for automated bandwidth reports. For example, the electronic data processing system 203 may be configured to request the automated reports on a periodic basis. Other factors may in addition or instead be applied, such as the type of network connection utilized by the client computer system, feedback about problems the client computer system is suffering, and/or information from other sources.

Figure 3:
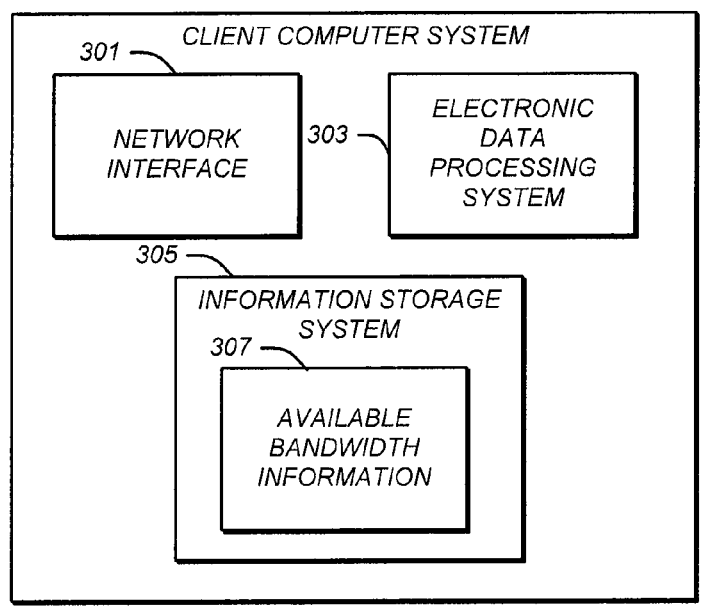
FIG. 3 illustrates a client computer system.

FIG. 3 illustrates a client computer system. The client computer system illustrated in FIG. 3 may function as the client computer system 101, 103, and/or 105 illustrated in FIG. 1, or in connection with a different system. Similarly, the client computer systems 101, 103, and/or 105 may be different than the client computer system illustrated in FIG. 3.

As illustrated in FIG. 3, the client computer system may include a network interface 301, an electronic data processing system 303, and an information storage system 305 which may contain available bandwidth information 307. The components of the client computer system may be at a single location or distributed across multiple locations.

The network interface 301 may be configured to communicate with an information server computing system over a network communication system, such as the information server computing system 107 and the network communication system 109. The network interface 301 may be of any type. For example, the network interface may be a network interface card ("NIC").

The electronic data processing system 303 may include computer hardware and computer software configured to perform the functions recited herein. The computer hardware may include one or more processors and supporting chips, as well as one or more storage devices, such as one or more hard disk drives, RAMS, ROMS, E-PROMS, and/or flash memories. The software may include one or more application programs, such as one or more web browser programs, and one or more operating systems.

The information storage system may include one or more electronic information storage devices, such as one or more hard disk drives, RAMS, ROMS, E-PROMS, and/or flash memories.

The electronic data processing system 303 may cause the network interface 301 to deliver a request to an information server computing system for electronic information. The request may be for any type of electronic information and in any form. For example, the request may be for a web page, an image file (including a multimedia file), a text file, streaming audio, streaming video, and/or streaming audio and video.

In response, the network interface 301 may receive a request from the information server computer system for an automated report of the bandwidth that is available for the delivery of the electronic information. In response, the electronic data processing system 303 may cause the network interface 301 to deliver an automated report of the bandwidth that is available for the delivery of the electronic information. This may be done without receiving user input relating to the content of the automated report following receipt of the request for the automated report.

To facilitate this, the available bandwidth may be stored in the information storage system 305 as available bandwidth information 307. This information may be in any form, such as in any of the forms discussed above in connection with the automated report received by the information server computer system in FIG. 2. For example, the available bandwidth information 307 may specify the bandwidth in bits per second, bytes per second, by specifying the type of internet connection to the client computer system (e.g., DSL or cable), by more general language (e.g., high, medium, or low), and/or in any other form.

The network interface 301 may then receive the requested electronic information in a form that is substantially compatible with the bandwidth specified in the automated report. This may be passed on to the electronic data processing system 303 for further processing. For example, the electronic data processing system 303 may cause the electronic information to be displayed in the form of images and/or text, may cause any sound that is part of the electronic information to be played over an audio system, and/or may cause the electronic information to be stored for further use.

The available bandwidth information 307 may be based on information from any source. For example, it may be based on information specified by a user in any of the forms discussed above. It may in addition or instead be based on one or more bandwidth tests which are performed by the client computer system. For example, the client computer system may upload and/or download a file, while timing the operation, thereby obtaining data from which the available bandwidth can be determined.

The client computer system under the control of the electronic data processing system 303 may be running multiple applications simultaneously, each one of which may communicate data over the network communication system. In this situation, the available bandwidth may have to be shared among the applications. In this situation, the available bandwidth information 307 may separately indicate the available bandwidth for each application. When a request for an automated report is received in response to a request by a particular application for electronic information, the automated report may be based on the bandwidth that is available for that particular application, as specified in the available bandwidth information 307.

When running multiple simultaneous applications, the available bandwidth information 307 for each application may be determined by any means. Examples of such means are set forth in U.S. patent application Ser. No. 12/829,869, entitled "Data Communication Device With Individual Application Bandwidth Reporting And Control," filed Jul. 2, 2010, the entire content of which is incorporated herein by reference.

Non-transitory computer-readable storage media may contain computer-readable programming instructions which, when read and executed by a data communication device, may cause the electronic data processing systems 203 and 303 to perform the functions recited herein.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

For example, a server can have multiple sites with different bandwidths. One can be just text for extremely low bandwidth, and another can be based on flash for high bandwidth. A server can ask the client to allocate more bandwidth if needed for an application.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

Nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

The invention claimed is:

1. An information server computer system comprising:
a network interface configured to communicate with a client computer system over a network communication system; and
an electronic data processing system configured to:
receive a request for electronic information which the network interface has received from the client computer system, the electronic information including a mixture of text and image information;
in response to the request, cause the network interface to deliver a request to the client computer system to calculate the bandwidth that is currently available for delivery of the electronic information and to provide an automated report of the currently available bandwidth;
receive the automated report of the bandwidth that is currently available for delivery of the electronic information which the network interface has received from the client computer system; and
in response to the automated report:
select a form of the electronic information which is compatible with the bandwidth specified in the automated report from among multiple forms that are each compatible with a respectively different available bandwidth, the selected electronic information including a mixture of text and image information from among multiple mixtures, the selected mixture of text and image information having a ratio of text-to-image information compatible with the bandwidth specified in the automated report; and
cause the network interface to deliver the electronic information in the selected form to the client computer system.

2. The information server computer system of claim 1 wherein the selection of the form of the electronic information includes selecting the form of the combined text and image information in which the image information has a resolution that is compatible with the bandwidth specified in the automated report from among multiple versions of the image information in the multiple mixtures of text and image information that are compatible with the respective different available bandwidths.

3. The information server computer system of claim 1 wherein the selection of a form of the electronic information includes:
when the bandwidth specified in the automated report is likely to result in dropouts or other adverse effects during the delivery of the electronic information to the client computer system, selecting a form of the electronic information that includes a notice that delivery of the electronic information may suffer from dropouts or other adverse effects; and
when the bandwidth specified in the automated report is not likely to result in dropouts or other adverse effects during the delivery of the electronic information to the client computer system, selecting a form of the electronic information that does not include a notice that delivery of the electronic information may suffer from dropouts or other adverse effects.

4. The information server computer system of claim 1 wherein the electronic data processing system is configured to repeatedly:
cause the network interface to request and receive automated reports of the bandwidth that is available for delivery of the electronic information; and
in response to each automated report:
select a form of the electronic information which is compatible with the bandwidth specified in the latest automated report from among multiple forms that are each compatible with a different available bandwidth; and
cause the network interface to deliver the remaining portion of the electronic information in the last-selected form to the client computer system.

5. Non-transitory, tangible, computer readable media containing computer programming instructions which, when executed by an information server computer system having a network interface configured to communicate with a client computer system over a network communication system and an electronic data processing system, cause the electronic data processing system to:

receive a request for electronic information which the network interface has received from the client computer system, the electronic information including a mixture of text and image information;

in response to the request, cause the network interface to deliver a request to the client computer system to calculate the bandwidth that is currently available for delivery of the electronic information and to provide an automated report of the currently available bandwidth;

receive the automated report of the bandwidth that is currently available for delivery of the electronic information which the network interface has received from the client computer system; and in response to the automated report:

select a form of the electronic information which is compatible with the bandwidth specified in the automated report from among multiple forms that are each compatible with a different available bandwidth, the selected electronic information including a mixture of text and image information from among multiple mixtures that are each compatible with a respectively different available bandwidth, the selected mixture of text and image information having a ratio of text-to-image information compatible with the bandwidth specified in the automated report; and cause the network interface to deliver the electronic information in the selected form to the client computer system.

6. The computer readable media of claim 5 wherein the selection of the form of the electronic information includes selecting the form of the combined text and image information in which the image information has a resolution that is compatible with the bandwidth specified in the automated report from among multiple versions of the image information in the multiple mixtures of text and image information that are compatible with the respective different available bandwidths.

7. The computer readable media of claim 5 wherein the selection of a form of the electronic information includes:

when the bandwidth specified in the automated report is likely to result in dropouts or other adverse effects during the delivery of the electronic information to the client computer system, selecting a form of the electronic information that includes a notice that delivery of the electronic information may suffer from dropouts or other adverse effects; and when the bandwidth specified in the automated report is not likely to result in dropouts or other adverse effects during the delivery of the electronic information to the client computer system, selecting a form of the electronic information that does not include a notice that delivery of the electronic information may suffer from dropouts or other adverse effects.

8. The computer readable media of claim 5 wherein the computer programming instructions, when executed by the information server computer system, cause the electronic data processing system to repeatedly:

cause the network interface to request and receive automated reports of the bandwidth that is available for delivery of the electronic information; and in response to each automated report:

select a form of the electronic information which is compatible with the bandwidth specified in the latest automated report from among multiple forms that are each compatible with a different available bandwidth; and cause the network interface to deliver the remaining portion of the electronic information in the last-selected form to the client computer system.

9. A client computer system comprising:

a network interface configured to communicate with an information server computer system over a network communication system; and an electronic data processing system configured to:

cause the network interface to deliver a request to the information server computer system for electronic information, the electronic information including a mixture of text and image information;

receive a request which the network interface has received from the information server computer system for an automated report of the bandwidth that is available for delivery of the electronic information;

responsive to the request, calculate the bandwidth that is currently available for delivery of the electronic information and automatically cause the network interface to deliver an automated report of the bandwidth that is currently available for delivery of the electronic information without receiving user input relating to the content of the automated report following receipt of the request for the automated report; and receive the requested electronic information which the network interface has received from the information server computer system, wherein the received electronic information includes a mixture of text and image information selected from multiple mixtures of text and image information, the selected electronic information having a ratio of text-to-image information that is compatible with the bandwidth specified in the automated report.

10. The client computer system of claim 9:

further comprising an information storage system configured to store information indicative of each bandwidth that is currently available for electronic information requested by a plurality of simultaneously-running user applications, the stored available bandwidth for each user application being less than the total bandwidth that is then available for electronic information requested by the client computer system; and wherein the electronic data processing system is configured to:

cause the network interface to deliver the request to the information server computer system for the electronic information when requested by one of the user applications; and cause the bandwidth that is specified in the automated report to be the available bandwidth for this one user application that is indicated in the information storage system.

11. The client computer system of claim 9 wherein the bandwidth specified in the automated report is less than the bandwidth which is available at the time of the automated report for delivery of the electronic information to the client computer system.

12. The client computer system of claim 9 wherein the bandwidth specified in the automated report is based on a bandwidth test of the client computer system which is performed by the client computer system.

13. Non-transitory, tangible, computer readable media containing computer programming instructions which, when executed by a client computer system having a network interface configured to communicate with an information server computer system over a network communication system and an electronic data processing system, cause the electronic data processing system to:

cause the network interface to deliver a request to the information server computer system for electronic information, the electronic information including a mixture of text and image information;

receive a request which the network interface has received from the information server computer system for an automated report of the bandwidth that is available for delivery of the electronic information;

responsive to the request, calculate the bandwidth that is currently available for delivery of the electronic information and automatically cause the network interface to deliver an automated report of the bandwidth that is currently available for delivery of the electronic information without receiving user input relating to the content of the automated report following receipt of the request for the automated report; and receive the requested electronic information which the network interface has received from the information server computer system, wherein the received electronic information includes a mixture of text and image information selected from multiple mixtures of text and image information, the selected electronic information having a ratio of text-to-image information that is compatible with the bandwidth specified in the automated report.

14. The computer readable media of claim 13 wherein:

the client computer system includes an information storage system configured to store information indicative of each bandwidth that is currently available for electronic information requested by a plurality of simultaneously-running user applications, the stored available bandwidth for each user application being less than the total bandwidth that is then available for electronic information requested by the client computer system; and the computer programming instructions, when executed by the information server computer system, cause the electronic data processing system to:

cause the network interface to deliver the request to the information server computer system for the electronic information when requested by one of the user applications; and cause the bandwidth that is specified in the automated report to be the available bandwidth for this one user application that is indicated in the information storage system.

15. The computer readable media of claim 13 wherein the bandwidth specified in the automated report is less than the bandwidth which the client computer system can handle.

16. The computer readable media of claim 13 wherein the bandwidth specified in the automated report is based on a bandwidth test of the client computer system which is performed by the client computer system.

* * * * *